United States Patent [19]

Gandolfo et al.

[11] 4,265,779

[45] May 5, 1981

[54] SUDS SUPPRESSING COMPOSITIONS AND DETERGENTS CONTAINING THEM

[75] Inventors: Daniel Gandolfo, Levallois Perret, France; David J. Cooper, Wezembeek-Oppem, Belgium

[73] Assignee: The Procter & Gamble Company, Cincinnati, Ohio

[21] Appl. No.: 72,254

[22] Filed: Sep. 4, 1979

[30] Foreign Application Priority Data

Sep. 9, 1978 [GB] United Kingdom ............... 36242/78

[51] Int. Cl.[3] .......................... C11D 7/24; C11D 7/16; B01D 19/04

[52] U.S. Cl. ....................................... 252/135; 252/99; 252/140; 252/174.21; 252/321; 252/358; 252/539; 252/558

[58] Field of Search ............... 252/116, 130, 139, 140, 252/135, 99, 155, 174.13, 174.15, 174.21, 321, 539, 558

[56] References Cited

U.S. PATENT DOCUMENTS

| | | | |
|---|---|---|---|
| 3,399,144 | 8/1968 | Hathaway et al. | 252/99 |
| 3,933,672 | 1/1976 | Bartolotta et al. | 252/116 |
| 4,065,481 | 11/1977 | Tate | 252/140 |
| 4,075,118 | 2/1978 | Gault et al. | 252/135 |
| 4,136,045 | 1/1979 | Gault et al. | 252/135 |
| 4,192,761 | 3/1980 | Peltre et al. | 252/99 |

FOREIGN PATENT DOCUMENTS

| | | | |
|---|---|---|---|
| 2354381 | 2/1978 | France | 252/174.13 |
| 6701484 | 8/1967 | Netherlands . | |
| 1204123 | 9/1970 | United Kingdom . | |
| 1492939 | 11/1977 | United Kingdom . | |

*Primary Examiner*—P. E. Willis, Jr.

[57] ABSTRACT

Storage stable, particulate suds suppressing compositions containing a liquid hydrocarbon, a nonionic ethoxylate and a compatibilizing agent capable of forming inclusion compounds are disclosed. In addition to the liquid hydrocarbon, the suds suppressing compositions frequently comprise additional suds suppressing agents such as silica and/or solid waxes. Granular detergents containing the particulate suds suppressing compositions and a method of enhancing the efficacy of liquid hydrocarbon suds regulants are also disclosed.

9 Claims, No Drawings

SUDS SUPPRESSING COMPOSITIONS AND DETERGENTS CONTAINING THEM

This invention relates to storage-stable, particulate suds suppressing compositions containing a liquid hydrocarbon, a nonionic ethoxylate and a compatibilizing agent capable of forming inclusion compounds. In addition to the liquid hydrocarbon, the suds suppressing compositions usually comprise additional suds suppressing agents such as silica and/or solid waxes. The suds suppressants herein can beneficially be utilized in granular detergent compositions. This invention also relates to a method of enhancing and maintaining the efficacy (functionality) of liquid paraffin in particulate suds suppressing compositions, especially under conditions of prolonged storage in admixture with granular detergents.

The effective and uniform control of the quality of suds formed during many industrial applications, especially during laundry operations in a long-standing and well-known product formulation aspect which requires additional improvement. Excessive sudsing can affect the overall textile cleaning and fabric benefits frequently conferred by modern detergent compositions, particularly when the washing treatment is carried out in drum washing machines. Too much sudsing in the washing machine is undesirable because not only does it interfere with and diminish the action of the laundry liquor upon the fabrics, but also residual suds in the washing machine can be carried over to the rinse cycle. This will not only increase the amount of suds in the rinse with the inherent difficulties of suppressing it but also can interfere with active-agents added to the rinsing step such as textile softeners.

As one could expect the prior art relative to detergent suds control is, commensurate with the efforts spent, very crowded and diverse. All the individual ingredients of the suds suppressing compositions herein are well-known in the detergent art and have found application for various functions. U.S. Pat. No. 3,207,698 Liebling et al., assigned to Mopco Chemical Company, discloses composition and method for defoaming aqueous systems wherein a hydrophobic precipitated silica having an alkaline pH is combined with a liquid hydrocarbon carrier. It is mentioned that the defoaming compositions are particularly well-suited for preventing and/or abating foam in aqueous systems such as in concentrated and/or diluted black liquor systems produced during the alkaline pulping process, in latex paint systems and in acidic white water systems of the paper making process.

German patent application DOS No. 23 35 468 discloses detergent compositions wherein a silicone/silica suds controlling agent is releasably incorporated into a water-soluble or water-dispersable, substantially non-surface-active, detergent-impermeable carrier. French Pat. No. 1,465,407 discloses detergent compositions having regulated suds wherein the regulating function is provided through the use of a hydrocarbon having a boiling point above about 90° C. in conjunction with a fatty acid having from 12 to 31 carbon atoms. The hydrocarbon can be represented by a 1:1 mixture of a liquid paraffin and a waxy paraffin. The suds regulant is incorporated into the detergent composition through slurrying with the other ingredients and spray-drying the slurry so obtained in a conventional manner.

French Pat. No. 1,489,395 relates to detergent compositions having controlled suds through the use of a system containing essentially a fatty acid having from 12 to 18 carbon atoms in conjunction with a waxy hydrocarbon having a melting point below 100° C. The compositions according to the '395 patent are prepared by separately agglomerating the suds regulating mixture or by spraying the suds regulating agents onto the detergent base-powder. German patent application DOS 25 09 508 discloses detergent compositions capable of providing effective suds control through the combined use of a system comprising a micro-crystalline wax having a melting point of from 35° C. to 125° C. in combination with a suds suppressing amount of a silicone suds controlling agent releasably incorporated into a water-soluble or water-dispersible, substantially non-surface-active detergent impermeable carrier.

Notwithstanding the known shortcomings, prior art compositions could provide at premium cost acceptable suds regulating activity in commercial detergent products. However, known detergent suds regulating technology can be deficient inasmuch as it requires relatively high levels ($>3\%$) of the regulant component(s) which levels can adversely affect the physical properties of the finished product and the ease of manufacturing. From a performance point of view, known suds regulating systems can affect performance due to a functional deficiency in one or more of the following areas; decreased regulatory activity at temperatures in the range about 75° C. up to the boil; decreased suds regulating activity in soft water; insufficient flexibility against stress conditions inclusive of low soil/high product usage and/or low water hardness; and no uniform control over the practical range of laundry temperatures extending from ambient temperature up to the boil. There is thus a standing desire for performance and additional reasons as set forth above, to make available a robust suds regulating system capable of providing superior activity over the whole range of laundry conditions occurring in the treatments as, for example, carried out by housewives.

A very effective suds regulating system is described in our copending British patent application No. 26323/77 (Case CM42) and comprises by weight of 99.9–75% of a suds regulating mixture consisting of by weight of the mixture from 30% to 98% of a liquid hydrocarbon, from 70% to 2% of a solid hydrocarbon melting at from 35° C. to 110° C., or a fatty ester having at least 16 carbon atoms in the molecule and at least one hydrocarbon radical with at least 12 carbon atoms, or mixtures thereof, together with from 0.1 to 25% of a hydrophobic silica.

It has been found that suds suppressing systems containing major amounts of liquid hydrocarbons, such as those of the above mentioned pending patent applications can lose some of their suds suppressing effectiveness during storage, particularly upon admixture with granular build detergent compositions. Apparently, this loss in suds regulant functionality is due to migration of the liquid hydrocarbon from the suds suppressant system into the detergent powder. Consequently, during usage the liquid hydrocarbon may become included in the detergent micelles and therefore be inhibited from reaching the air-water interface where its suds suppressing activity is believed to take effect.

It is a main object of this invention to formulate storage-stable particulate liquid hydrocarbon containing suds suppressing compositions.

It is another object of this invention beneficially to incorporate particulate liquid hydrocarbon suds regulants in granular detergent compositions.

It is still another object of this invention to provide a method of enhancing the efficacy of liquid hydrocarbon containing suds suppressing compositions, especially in admixture with granular detergents.

The above and other objects can now be met as is explained in more detail hereinafter.

It has now been discovered that superior storage-stable particulate liquid hydrocarbon containing suds suppressing compositions can be formulated comprising a ternary mixture of (a) a substantially water-insoluble hydrocarbon, liquid at room temperature and atmospheric pressure;
(b) a nonionic ethoxylate having an HLB in the range from 14 to 19; and
(c) a compatibilizing agent capable of forming inclusion compounds;

the weight ratio of component (a) to component (b) being in the range from 5:1 to 1:4 and that of components (a)+(b) together to component (c) being in the range from 20:1 to 1:2.

Preferred liquid hydrocarbons are of the naphthenic and/or paraffinic type. The most preferred compatibilizing agent is urea.

The suds suppressing compositions herein are especially useful for incorporation in granular built detergent compositions.

It has now been found that the tendency for hydrocarbon oil to migrate from suds suppressing systems and the concurrent suds regulant deactivation, especially granular detergent compositions, can be reduced or eliminated by formulating the suds suppressing system with two interacting substances, namely a nonionic ethoxylate and a compatibilizing agent capable of forming inclusion compounds.

The individual ingredients are discussed in more detail hereinafter.

Unless stated to the contrary the "%" indications stand for percent-by-weight, and "parts" refer to parts by weight.

The term "particulate" is used for any kind of solid appearance inclusive of flakes, powders, granules etc.

In the specification the following descriptive expressions are used:

| | |
|---|---|
| Suds suppressing agents | substances such as hydrocarbon oil, silica, silicones, waxes, high molecular fatty acids and soaps. |
| Suds suppressing system | Specified mixtures of the above. |
| Suds suppressing compositions | Mixtures of the "systems" with other organic components. |
| Suds suppressing product | Mixtures of the "composition" with inorganic components; granular or particulate solid forms of the composition, referred to as granules etc., as appropriate. |
| Detergent composition | Composition comprising organic detergent, builders etc. with or without the suds depressant composition or product. |

The present invention provides a particulate suds suppressing compositions comprising:

a ternary mixture of (a) a normally liquid hydrocarbon (b) a nonionic ethoxylate having an HLB in the range from 14 to 19; and
(c) a compatibilizing agent capable of forming inclusion compounds, whereby:

the weight ratio of component (a) to component (b) is in the range from 5:1 to 1:4, preferably from 2:1 to 1:2, and that of components (a)+(b) together to component (c) is in the range from 20:1 to 1:2, preferably 10:1 to 1:1.

The suds suppressing compositions herein comprise as a first essential ingredient a liquid hydrocarbon. Suitable liquid hydrocarbons for use in the practice of this invention may be any aliphatic, alicyclic, aromatic or heterocyclic saturated or unsaturated hydrocarbons having generally from about 12 to about 70 carbon atoms. Paraffins are preferred hydrocarbons herein. Paraffins are generally obtained from petroleum by various methods inclusive of fractionation distillation, solvent extraction, cracking, reforming or polymerization of lower olefines or diolefines. Paraffin can also be synthesized from coal thereby using the Fischer-Tropsch process, or by hydrogenation of unsaturated hydrocarbons. Paraffins are preferably obtained by solvent extracting the solid residue of petroleum distillation.

The term "paraffin" here is used in its colloquial sense to include mixtures of true paraffins and cyclic hydrocarbons, as derived from petroleum sources.

The hydrocarbon herein, liquid at room temperature and atmospheric pressure, normally has a pour point in the range of −40° C. to 5° C. and usually contains from 12 to 40 carbon atoms. The liquid hydrocarbon should normally have a minimum boiling point of not less than 110° C. (at atmospheric pressure). Liquid paraffins, preferably of the naphthenic and/or paraffinic type, also known as mineral white oil are preferred.

The second essential component herein is represented by a nonionic ethoxylate having an HLB (hydrophilic-lipophilic balance) in the range from 14 to 19.

Preferred nonionic ethoxylates are ethoxylated $C_{12}$ to $C_{20}$ monohydric alcohols, having an average of from 15 to 100 ethoxy groups per molecule, abbreviated $C_{12}$—$C_{20}$ $E_{15-100}$. Preferred are $C_{16-18}E_{20-80}$. The alcohol portion may be primary or secondary, branched or unbranched. Tallow alcohol ethoxylates are preferred.

Other suitable nonionic ethoxylates include the ethoxylated $C_{8-16}$ alkyl phenols.

The third component of the compositions of the invention is a compatibilizing agent which stabilises the suds regulating activity of the compositions, perhaps by inhibiting migration of the liquid hydrocarbon component. Suitable substances are usually those able to form inclusion compounds of clathrates.

Clathrates are inclusion (enclosed) compounds, a term applied to a solid molecular aggregate in which a molecule of one compound is physically enclosed in the crystal structure of a second compound so that the properties of the aggregate are essentially those of the enclosing compound. Preferred enclosing compounds can form a channel structure.

It has been found that the sole use of a compatibilizing agent such as urea will normally not produce the superior suds suppressing compositions herein. While the utilization of large amounts of nonionic ethoxylates could lead to acceptable liquid hydrocarbon stabilization, the ethoxylate levels required are relatively high and this is economically uninteresting and represents an undesirably high proportion of diluent material associated with the oil.

Examples of suitable compatibilizing agents include urea which is highly preferred; thiourea, desoxycholic acid and its water-soluble salts, α- or β-cyclodextrin, and 4,4'-dinitrobiphenyl.

The suds suppressing compositions herein can be utilized beneficially for all kinds of industrial applications where effective suds regulation could be a controlling factor. The subject technology is especially adapted for use in granular detergent compositions, inclusive of built detergent compositions.

A highly preferred detergent suds suppressing system comprises the liquid hydrocarbon as more fully described above, an adjunct material selected from a solid hydrocarbon having a melting point from about 35° C. to about 110° C.; a fatty ester of mono- or poly-hydric alcohols having from 1 to about 40 carbon atoms in the hydrocarbon chain, and mono- or poly-carboxylic acids having from 1 to about 40 carbon atoms in the hydrocarbon chain, and mixtures thereof; and a hydrophobic silica suds regulating agent. From 99.9% to about 75%, preferably from about 99.5% to about 80% of the suds regulating system is represented by the mixture of the liquid hydrocarbon and the adjunct material. The liquid hydrocarbon represents from about 30% to about 98% of the liquid hydrocarbon/adjunct material mixture, while the adjunct material represents from about 70% to about 2% of said mixture of liquid hydrocarbon/adjunct material.

The adjunct material hydrocarbon has a melting point in the range from about 35° C. to about 110° C. and comprises generally from 12 to 70 carbon atoms. Preferred solid hydrocarbon species have a melting point from about 45° C. to about 60° C. Other preferred solid hydrocarbon species herein have a melting point from 80° C. to 95° C. Preferred hydrocarbon adjunct materials are petroleum waxes of the paraffin and microcrystalline type which are composed of long-chain saturated hydrocarbon compounds. The hydrocarbon adjunct material is preferably used in an amount from about 40% to about 2% of the mixture of liquid hydrocarbon and hydrocarbon adjunct material. The liquid hydrocarbon component represents preferably from about 60% to about 98% of the mixture of liquid hydrocarbon and hydrocarbon adjunct material.

The adjunct material can also be represented by a fatty ester of mono- or polyhydric alcohols having from 1 to about 40 carbon atoms in the hydrocarbon chain, and mono- or polycarboxylic acids having from 1 to about 40 carbon atoms in the hydrocarbon chain with the provisos that the total number of carbon atoms in the ester is equal to or greater than 16 and that at least one of the alkyl radicals in the ester has 12 or more carbon atoms. The fatty ester is preferably used in an amount from about 10% to about 70% of the mixture of liquid hydrocarbon and fatty ester adjunct material. The liquid hydrocarbon component represents preferably from about 30% to about 90% of the mixture of liquid hydrocarbon and fatty ester adjunct material.

The fatty ester adjunct material can be of natural or synthetic origin. Examples of suitable natural fatty esters herein include: beeswax from honeycombs which consists chiefly of the esters $CH_3(CH_2)_{24}COO(CH_2)_{27}CH_3$ and $CH_3(CH_2)_{26}COO(CH_2)_{25}CH_3$; carnauba wax from the Brazilian palm which is a mixed ester containing principally $C_{31}H_{63}COOC_{32}H_{65}$ and $C_{33}H_{67}COOC_{34}H_{69}$; and spermaceti (wax) from the sperm whale which is mainly $C_{15}H_{31}COOC_{16}H_{33}$.

The fatty acid portion of the fatty ester can be obtained from mono- or poly-carboxylic acids having from 1 to about 40 carbon atoms in the hydrocarbon chain. Suitable examples of monocarboxylic fatty acids include behenic acid, stearic acid, oleic acid, palmitic acid, myristic acid, lauric acid, acetic acid, propionic acid, butyric acid, isobutyric acid, valeric acid, lactic acid, glycolic acid and β,β'-dihydroxyisobutyric acid. Examples of suitable polycarboxylic acids include: n-butyl-malonic acid, isocitric acid, citric acid, maleic acid, malic acid, and succinic acid.

The fatty alcohol radical in the fatty ester can be represented by mono- or polyhydric alcohols having from 1 to 40 carbon atoms in the hydrocarbon chain. Examples of suitable fatty alcohols include: behenyl, arachidyl, cocoyl, oleyl and lauryl alcohol, ethylene glycol, glycerol, ethanol, isopropanol, vinyl alcohol, diglycerol, xylitol, sucrose, erythritol, pentaerythritol, sorbitol or sorbitan.

Preferably, the fatty acid and/or fatty alcohol group of the fatty ester adjunct material have from 1 to 24 carbon atoms in the alkyl chain.

Preferred fatty esters herein are ethylene glycol, glycerol and sorbitan esters wherein the fatty acid portion of the ester normally comprises a species selected from behenic acid, stearic acid, oleic acid, palmitic acid or myristic acid.

Sorbitol, prepared by catalyst hydrogenation of glucose, can be dehydrated in well-known fashion to form mixture of 1,4 and 1,5-sorbitol anhydrides and small amounts of isosorbides. (See Brown, U.S. Pat. No. 2,322,821, issued June 29, 1943). This mixture of sorbitol anhydrides is collectively referred to as sorbitan. The sorbitan mixture will also contain some free, uncyclized sorbitol. Sorbitan esters useful herein can be prepared by esterifying the "sorbitan" mixture with a fatty acyl group in standard fashion, eg., by reaction with a fatty acid halide or fatty acid. The esterification reaction can occur at any of the available hydroxyl groups, and various mono-, di- etc., esters can be prepared. In fact, mixtures of mono-, di-, tri-, etc., esters almost always result from such reactions. Esterified hydroxyl groups can, of course, be either in terminal or internal positions within the sorbitan molecule.

It is also to be recognized that the sorbitan esters employed herein can contain up to about 15% by weight of esters of the $C_{20}$—$C_{26}$, and higher, fatty acids, as well as minor amounts of $C_8$, and lower, fatty esters. The presence or absence of such contaminants is of no consequence in the present invention.

The glycerol esters are also highly preferred. These are the mono-, di- or tri-esters of glycerol and the fatty acids as defined above.

Specific examples of fatty alcohol esters for use herein include: stearyl acetate, palmityl di-lactate, cocoyl isobutyrate, oleyl maleate, oleyl dimaleate, and tallowyl proprionate. Fatty acid esters useful in the present invention include: xylitol monopalmitate, pentaerythritol monostearate, sucrose monostearate, glycerol monostearate, ethylene glycol monostearate, sorbitan esters. Suitable sorbitan esters include sorbitan monostearate, sorbitan palmitate, sorbitan monolaurate, sorbitan monomyristate, sorbitan monobehenate, sorbitan monooleate, sorbitan dilaurate, sorbitan distearate, sorbitan dibehenate, sorbitan dioleate, and also mixed tallowalkyl sorbitan mono- and di-esters.

Glycerol monostearate, glycerol mono-oleate, glycerol monopalmitate, glycerol monobehenate, and glycerol distearate are specific examples of the preferred glycerol esters.

The fatty esters in the suds regulating system herein frequently contain a number of carbon atoms equal to or greater than 16; normally, suitable fatty esters contain at least one alkyl radical having 12 or more carbon atoms.

The adjunct material can also be represented by a mixture of the adjunct solid hydrocarbon and the adjunct fatty ester. Such adjunct material mixtures preferably contain the adjunct hydrocarbon to adjunct fatty ester in a weight ratio of hydrocarbon:ester from 1:20 to 2:1 more preferably from 1:5 to 2:1.

Another essential component herein is a hydrophobic silica suds regulating agent which is used in an amount from 0.1% to about 25%, preferably from 10% to about 20% of the suds suppressing system i.e. containing the liquid hydrocarbon, the adjunct material and the silica.

Suitable silica suds regulating agents herein are microfine, hydrophobic, particulate silicas. These silicas usually have an average primary particle diameter from about 5 millimicrons (mμ) to about 100 mμ, preferably from 10 mμ to 30 mμ. The primary particles can form aggregates—frequently termed secondary particles—having frequently an average particle diameter in the range from about 0.3μ to about 3μ. Suitable silica components can additionally be characterised by a specific surface area from about 50 $m^2/g$ to about 400 $m^2/g$, preferably from 100 $m^2/g$ to 200 $m^2/g$. The specific surface area can be determined with the aid of the $N_2$-adsorption method. The preferred silica component herein can additionally be defined in having a pH in the range from 8 to 12, to thus be better compatible with the usually alkaline laundry solution. Generally preferred herein are precipitated hydrophobic microfine silicas with preferred species are commercially available under the Trade Names QUSO WR82 and QUSO WR 50 from Philadelphia QUARTZ Company. Additional examples of suitable silicas herein can include pyrogenic silica and aerogel and xerogel silicas provided their general physical properties are as set forth above. The silica can be rendered hydrophobic through one of the well-known treatments such as e.g. disclosed in U.S. Pat. No. 3,207,698, or U.K. Patent Application No. 10734/74 of Mar. 11, 1974.

The silica component can be used as such or in conjunction with other compounds such as silicones. Suitable silica/silicone mixtures are commercially available from DOW CORNING Comp.; the silica can be physically or chemically bond to part or all of the silicone fluid. In such silica/silicone mixtures, the silica frequently represents up to about 50%, preferably from 5% to 20% of the mixture of silica and silicone.

Suds suppressing compositions containing relatively low levels of the compatibilizing agent e.g. comprising components (a):(b):(c) in ratios from about 1:0.8–1:0.05–0.5 can be relatively soft sticky solids at room temperature but melt to form liquids or slurries of viscosity such that they can be sprayed at moderate temperatures e.g. below about 80° C. These compositions cannot be conveniently incorporated as such in granular detergent compositions. They can however be sprayed in the molten state onto suitable water-soluble carriers e.g. inorganic salts. Desirably, salts are chosen which are components of any detergent composition in which the suds suppressing composition is to be incorporated, such as sodium phosphates, sodium tripolyphosphate, sodium sulphate, sodium carbonate and sodium perborate. It is preferred to spray the molten suds suppressing composition (comprising components (a), (b) and (c) onto a fluidised bed of said inorganic salt; the preferred salt is sodium tripolyphosphate. Suitably about 2 parts of suds suppressant composition are sprayed on to from 5 lt 12 parts of carrier salt.

Mixtures containing relatively high levels of urea and like, e.g. comprising components (a):(b):(c) in ratios about 1:0.5–1:0.5–1.5, and especially about 1:1:1 do not melt properly to form a sprayable liquid at convenient temperatures and those at which the components do not start to decompose. They do, however, form non sticky solids at room temperature, and they can be converted into particulate form as such, as by extrusion, grinding or any other suitable method.

The resultant particles constitute the suds suppressing products of the invention which are suitable for dry mixing with e.g. preformed granules consisting of other components of a detergent composition.

The invention also embraces granular detergent compositions containing the suds suppressing composition or more preferably the suds suppressing products of the invention. The detergent compositions can be of widely varying formula, and comprise from 3 to 70%, preferably 3 to 50% of an organic surface active agent, and usually contain from 3 to 50% of a detergent builder component.

Suitable organic surface-active agents herein can be represented by active ingredients which are known to meet the requirements for use in and/or have already been used in detergent compositions. Exemplifying species for use herein can be selected from the group of anionic, nonionic, ampholytic, zwitterionic, and cationic surfactants and mixtures thereof.

Examples of suitable nonionic surfactants include:

(1) The polyethylene oxide condensates of alkyl phenols. These compounds include the condensation products of alkyl phenols having an alkyl group containing from about 6 to 12 carbon atoms in either a straight chain or branched chain configuration, with ethylene oxide, the said ethylene oxide being present in amounts equal to 5 to 25 moles of ethylene oxide per mole of alkyl phenol.

(2) The condensation products of aliphatic alcohols with ethylene oxide. The alkyl chain of the aliphatic alcohol may either be straight or branched and generally contains from about 8 to about 22 carbon atoms. Examples of such ethoxylated alcohols include the condensation product of about 6 moles of ethylene oxide with 1 mole of tridecanol, myristyl alcohol condensed with about 10 moles of ethylene oxide per mole of myristyl alcohol, the condensation product of ethylene oxide with coconut fatty alcohol wherein the coconut alcohol is a mixture of fatty alcohols with alkyl chains varying from 10 to 14 carbon atoms and wherein the condensate contains about 6 moles of ethylene oxide per mole of alcohol, and the condensation product of about 9 moles of ethylene oxide with the above-described coconut alcohol.

(3) The condensation products of ethylene oxide with the product resulting from the reaction of propylene oxide and ethylene diamine. The condensation product frequently contains from about 40 to about 80% by weight of polyoxyethylene and has a molecular weight of from about 5,000 to about 11,000.

(4) Amine oxide surfactants inclusive of dimethyldodecylamine oxide, dimethyltetradecylamine oxide, ethylmethyltetradecylamine oxide, cetyldimethylamine oxide, dimethylstearylamine oxide, cetylethylpropylathis type has the formulation $Na_z(AlO_2)_z(SiO_2)_y.xH_2O$ wherein z and y are integers of at least 6, the molar ratio of z to y is in the range from 1.0 to about 0.5 and x is an integer from about 15 to about 264. Compositions incorporating builder salts of this type form the subject of British Patent Specification No. 1,429,143 published Mar. 24, 1976, German Patent Application Nos. OLS 24 33 485 published Feb. 6, 1975, and OLS 25 25 778 published Jan. 2, 1976, the disclosures of which are incorporated herein by reference.

Another type of detergency builder material useful in the present invention comprises a water-soluble material capable of forming a water-insoluble reaction product with water hardness cations, preferably in combination with a crystallization seed which is capable of providing growth sites for said reaction product. Specific examples of materials capable of forming the water-insoluble reaction product include the water-soluble salts of carbonates, bicarbonates, sesquicarbonates, silicates, aluminates and oxalates. The alkali metal, especially sodium, salts of the foregoing materials are preferred for convenience and economy. Preferred crystallization seed materials are calcium carbonate, calcium oxide and calcium hydroxide. Such "seed builder" compositions are fully disclosed in British Patent Specification No. 1,424,406, incorporated herein by reference.

Non-seeded precipitating builder systems employing pyrophosphates or mixtures thereof with orthophosphates are also useful herein. Precipitating pyrophosphate and ortho-pyrophosphates builder systems are disclosed in German Patent Applications OLS No. 25 42 704 and 26 05 052 published Apr. 15 and Aug. 16, 1976, respectively and British Patent Application No. 76-33768 filed Aug. 13, 1976, which are specifically incorporated herein by reference.

The granular detergent compositions can also advantageously contain a peroxy-bleach component in an amount from about 3% to about 50%, preferably from about 8% to about 35%. Examples of suitable peroxy-bleach components herein include perborates, persulfates, persilicates, perphosphates, percarbonates and more in general all inorganic and organic peroxy-bleaching agents which are known to be adapted for use in the subject compositions. Organic oxygen-bleach activators can also advantageously be used in oxygen-bleach detergent compositions. Examples of such activators include phthalic anhydride, tetraacetyl ethylenediamine, tetraacetyl methylenediamine, and tetraacetyl glycouril. These activators produce in the laundry liquor organic peroxy-acids which have enhanced low temperature bleach performance. Activators of this type are normally used with sodium perborate at usage levels from about 0.5% to 15%, preferably from 3% to 7%.

In addition to the components described hereinbefore, the compositions of this invention can comprise a series of supplementary components to perfect and complement the performance advantages derivable from the combination of essential components. These additional components include brighteners, dyes, perfumes, bactericides, processing aids, antioxidants, corrosion inhibitors, enzymes and so on.

Preferably the detergent compositions contain the suds suppressing composition in amount sufficient to provide from 0.01% to 5%, of component (a).

This invention also relates to a method for enhancing the efficacy of liquid hydrocarbon suds regulants as built granular detergent compositions. More specifically, the detergent suds suppressing functionality of the liquid hydrocarbon is enhanced and stabilized, especially during prolonged storage by intimately mixing the liquid hydrocarbon with a nonionic ethoxylate having an HLB in the range from 14 to 19 and a compatibilizing agent capable of forming inclusion compounds.

The following examples illustrate the invention and facilitate its understanding.

EXAMPLES 1-6

A suds suppressant system (S.S.S.) was prepared by melting together at about 85° C. with high shear mixing the listed ingredients in the stated proportions:

| INGREDIENTS | PARTS |
|---|---|
| Liquid Paraffin (supplied by Witco, Holland as Carnation Oil) | 59 |
| Paraffin Wax (M.P. 52-54° C.) | 23 |
| Hydrophobic silica (QUSO WR82, supplied by Philadelphia Quartz Co.) | 18 |

Suds suppressant compositions were prepared by high shear mixing together in the molten state (about 85° C.) the S.S.S. defined above, with the ethoxylate/-compatibilizing combinations listed below.

The resulting fluid mixtures (slurries) were cooled to room temperature. The tendancy for their paraffin oil component to migrate out of the mixture was compared by means of a "paper absorption" test. About 10 g. samples of flakes of the composition were placed in folded absorbent paper and subjected to sufficient weight to ensure good contact between the sample and the paper. They were stored at controlled temperature for various times (e.g. up to 4 weeks at 38° C.) and the weight of oil absorbed by the paper was compared from sample to sample.

| | Suds Suppressant Composition (in parts) | | | | | | |
|---|---|---|---|---|---|---|---|
| Example No. | 1 | 2 | 3 | 4 | 5 | 6 | Reference |
| S.S.S. | 1 | 1 | 1 | 1 | 1 | 1 | 1 |
| Condensation product of one mole of tallow alcohol and 25 moles of ethylene oxide | 1 | 1 | 1 | 1 | 1 | 1 | 1 |
| Urea | 0.2 | 1.3 | — | — | — | — | — |
| Thiourea | — | — | 0.2 | 1.3 | — | — | — |
| Desoxy cholic acid | — | — | — | — | 0.9 | 1.3 | — |

The absorbent paper had taken up the following percentages of the liquid hydrocarbon originally present in the solid suds suppressant composition.

| Example No. | 1 | 2 | 3 | 4 | 5 | 6 | Reference |
|---|---|---|---|---|---|---|---|
| 1 week | 0 | 0 | 5.7 | 0 | 4 | 0 | 17 |
| 4 weeks | 11.3 | 0 | 11.7 | 1.7 | 9. | 3 | 24 |

The above data clearly show that suds regulant compositions 1 through 6 in accordance with this invention lost markedly less hydrocarbon than the reference sample. It was also found that higher absorbancy into the absorbent paper correlated with decreased suds regulating efficacy e.g. of the above suds suppressing composition when incorporated into granular detergents and held in storage.

mine oxide, diethyldodecylamine oxide, and diethyltetradecylamine oxide.

(5) Suitable phosphine oxide detergents include: dimethyldodecylphosphine oxide, dimethyltetradecylphosphine oxide and ethylmethyltetradecylphosphine oxide; suitable sulfoxide surfactants include octadecylmethyl sulfoxide, dodecylmethyl sulfoxide and tetradecylmethyl sulfoxide.

Examples of suitable ampholytic synthetic detergents are sodium 3-(dodecyl-amino)propionate, and sodium 3-(dodecylamino)propane-1-sulfonate.

Zwitterionic surfactants for use herein include 3-(N,N-dimethyl-N-hexadecylammonio)-2-hydroxypropane-1-sulfonate, 3-(N,N-dimethyl-N-alkylammonio)-2-hydroxypropane-1-sulfonate, the alkyl group being derived from tallow fatty alcohol; 3-(N,N-dimethyl-N-hexadecylammonio)propane-1-sulfonate; 3-(N,N-dimethyl-N-tetradecylammonio)propane-1-sulfonate; and 3-(N-N-dimethyldodecylammonio)-2-hydroxypropane-1-sulfonate.

Suitable anionic detergents include ordinary alkali metal soaps of higher fatty acids containing from about eight to about 24 carbon atoms and preferably from about 10 to about 20 carbon atoms.

Alkyl sulfonated or sulfated surfactants inclusive of alkyl benzene sulfonates, in which the alkyl group contains from about 9 to about 20 carbon atoms in straight-chain or branched-chain configuration, e.g., those of the type described in U.S. Pat. Nos. 2,220,099 and 2,477,383 (especially valuable are linear straight chain alkyl benzene sulfonates in which the average of the alkyl groups is about 11.8 carbon atoms and commonly abbreviated as $C_{11.8}$ LAS); sodium alkyl glyceryl ether sulfonates, especially those ethers of higher alcohols derived from tallow and coconut oil; sodium coconut oil fatty acid monoglyceride sulfonates and sulfates.

Useful in this invention are also salts of 2-acyloxyalkane-1-sulfonic acids.

Typical examples of the 2-acyloxy-alkanesulfonates are described in Belgium Pat. No. 650,323 issued July 9, 1963, U.S. Pat. Nos. 2,094,451 issued Sept. 28, 1937 to Guenther et al, and 2,086,215 issued July 6, 1937 to DeGroote; these references are hereby incorporated by reference.

$\beta$-alkloxy alkane sulfonates can also be used. Specific examples of $\beta$-alkyloxy alkane sulfonates having low hardness (calcium ion) sensivity useful herein to provide superior cleaning levels under household washing conditions include: potassium-$\beta$-methoxydecanesulfonate, sodium 2-methoxytridecanesulfonate, potassium 2-ethoxytetradechylsulfonate, and sodium 2-isopropoxyhexadecylsulfonate.

Paraffin sulfonates containing a straight or branched chain, saturated aliphatic hydrocarbon radical having from 8 to 24, preferably 12 to 18, carbon atoms can also be used.

Other synthetic anionic detergents useful herein are alkyl ether sulfates. These materials have the formula $RO(C_2H_4O)_xSO_3M$ wherein R is alkyl or alkenyl of about 10 to about 20 carbon atoms, x is 1 to 30, and M is a water-soluble cation.

Suitable examples of alkyl ether sulfates are those comprising a mixture of individual compounds, said mixture having an average alkyl chain length of from about 12 to 16 carbon atoms and an average degree of ethoxylation of from about 1 to 4 moles of ethylene oxide. Such a mixture also comprises from about 0 to 20% by weight $C_{12-13}$ compounds; from 60 to 100% by weight of $C_{14-15-16}$ compounds; from 0 to 20% by weight of $C_{17-18-19}$ compounds; from about 3 to 30% by weight of compounds having a degree of ethoxylation of 0; from about 45 to 90% by weight fo compounds having a degree of ethoxylation of from 1 to 4; from about 10 to 25% by weight of compounds having a degree of ethoxylation of from 4 to 8; and from about 0.1 to 15% by weight of compounds having a degree of ethoxylation greater than 8.

$\alpha$-Olefin sulfonate mixtures as described in U.S. Pat. No. 3,332,880, issued July 25, 1967, incorporated herein by reference, can also be used.

Cationic surface-active agents inclusive of di($C_{12}$–$C_{20}$) alkyl, di($C_{1-4}$)alkyl ammonium halides, and imidazolinium derivatives can also be used in the compositions herein.

Preferred detergent compositions containing the suds suppressing compositions and products of the invention comprise anionic and/or nonionic surfactants at level in the range from 3% to 20%.

Useful builders herein include any of the conventional inorganic and organic water-soluble builder salts as well as various water-insoluble and so-called "seeded" builders.

Detergency builder salts useful herein can be of the polyvalent inorganic and polyvalent organic types, or mixtures thereof. Non-limiting examples of suitable water-soluble, inorganic alkaline detergency builder salts include the alkali metal carbonates, borates, phosphate, polyphosphates, tripolyphosphates, bicarbonates, silicates, and sulfates. Specific examples of such salts include the sodium and potassium tetraborates, bi-carbonates, carbonates, tripolyphosphates, pyrophosphates, and hexametaphosphates.

Examples of suitable organic alkaline detergency builder salts are: (1) water-soluble amino polyacetates, e.g. sodium and potassium ethylenediaminetetraacetates, nitrilotriacetates, and N-(2-hydroxyethyl)nitrilodiacetates; (2) water-soluble salts of phytic acid, e.g. sodium and potassium phytates; (3) water-soluble polyphosphonates, including sodium, potassium and lithium salts of ethane-1-hydroxy-1,-diphosphonic acid; sodium, potassium, and lithium salts of methylenediphosphonic acid and the like.

Additional organic builder salts useful herein include the polycarboxylate materials described in U.S. Pat. No. 2,264,103, including the water-soluble alkali metal salts of mellitic acid. The water-soluble salts of polycarboxylate polymers and copolymers such as are described in U.S. Pat. No. 3,308,067, incorporated herein by reference, are also suitable herein.

It is to be understood that while the alkali metal salts of the foregoing inorganic and organic polyvalent anionic builder salts are preferred for use herein from an economic standpoint, the ammonium, alkanolammonium (e.g., triethanolammonium, diethanolammonium and monoethanolammonium) and other water-soluble salts of any of the foregoing builder anions can also be used.

Mixtures of organic and/or inorganic builders can be used herein. One such mixture of builders is disclosed in Canadian Pat. No. 755,038, e.g. a ternary mixture of sodium tripolyphosphate, trisodium nitrilotriacetate, and trisodium ethane-1-hydroxy-1,1-diphosphonate.

A further class of builder salts in the water-insoluble alumino silicate type which functions by cation exchange to remove polyvalent mineral hardness and heavy metal ions from solution. A preferred builder of

EXAMPLES 7–9

A suds suppressing system was prepared by melting together at about 85° C., with high shear mixing, the listed ingredients in the stated proportions, in parts by weight.

| EXAMPLE NO. | 7 | 8 | 9 |
|---|---|---|---|
| Paraffin Oil (as in Examples 1–6) | 59 | 59 | 59 |
| Paraffin Wax (M pt 52–54° C.) | 23 | 23 | 23 |
| Glycerol monostearate | — | — | 20 |
| Hydrophobic Silica | 18 | 18 | 18 |

Suds suppressing compositions were prepared with the aid of ethoxylates and compatibilizing agents as more fully described in Examples 1 to 6, the following compositions.

| Suds Suppressing System of Example | 7 | 8 | 9 |
|---|---|---|---|
| Parts by weight | 1 | 1 | 1.2 |
| Condensation product of 1 mole of tallow alcohol with 25 moles of ethylene oxide | 0.9 | 0.8 | 0.8 |
| Urea | 0.1 | 0.2 | 0.2 |

20 parts by weight of each of these suds suppressing compositions, in molten form, were sprayed on to a fluidised bed of 80 parts of anhydrous sodium tripolyphosphate, thereby forming particles of a suds suppressant product consisting predominantly of globules of the suds suppressant composition surrounded by particles of tripolyphosphate.

The suds suppressant product was dry mixed with a spray dried built-detergent base powder and with sodium perborate in amounts such as to provide a composition consisting essentially of:

| | |
|---|---|
| Sodium linear dodecylbenzene sulphonate | 16% |
| Sodium tripolyphosphate | 32% |
| Sodium perborate | 24% |
| Suds suppressing system | 0.8% |
| Minor ingredients inclusive of sodium, sulphate, sodium silicate, moisture, etc. | Balance to 100% |

When tested for sudsing in the 30° C. cycle of a MIELE washing machine in load conditions tending to provide high sudsing, compositions 7–9 gave less suds-fresh and after 2 months storage at room temperature than a reference compositions wherein 2 parts of a condensate of one mole of tallow alcohol and 25 moles of ethylene oxide were used instead of the ethoxylate/urea combinations of inventive compositions 7–9.

Substantially comparable performance is obtained when the paraffin wax in Example 7 is replaced by an equivalent amount of: beeswax; carnauba wax; ethylene glycol monostearate; glycerol monostearate; rapeseed monoglyceride; sorbitan tristearate having a HLB in the range from 4–9; and mixtures thereof.

Substantially comparable performance is also obtained when the tallow alcohol ethylene oxide condensate of example 8 is replaced by an ethoxylate selected from: the condensation product of one mole of tallow fatty alcohol with 20 or 80 moles of ethylene oxide; and one mole of coconut alcohol with 15 or 40 moles of ethylene oxide.

EXAMPLE 10

A suds suppressant composition was prepared as described in Examples 1–6 containing the following ingredients:

| | Parts |
|---|---|
| Suds suppressing system of Examples 1–6 | 1 |
| Condensation product of one mole tallow fatty alcohol and 25 moles of ethylene oxide | 1 |
| Urea | 1 |

The slurry was cooled and thereafter extruded to form noodles. 2.4% of the noodles were incorporated in the detergent composition of Examples 7–9. When tested in a washing machine as in Examples 7–9, a low level of suds was obtained with fresh product, and with product stored at room temperature for up to one month.

EXAMPLES 11–15

Suds suppressant compositions in (in parts) accordance with this invention having the following formulae are prepared.

| EXAMPLE NO. | 11 | 12 | 13 | 14 | 15 |
|---|---|---|---|---|---|
| Liquid Paraffin oil | 70 | 52 | 56 | 45 | 50 |
| Paraffin Wax (MP 50–54° C.) condensate of tallow alcohol and 25 moles of ethylene oxide. | 20 | 70 | — | — | — |
| Condensate of coconut alcohol with 15 moles of ethylene oxide | 30 | — | — | — | 50 |
| Hydrophobic Silica | 5 | 18 | 14 | 9 | 20 |
| Glycerol Monostearate | 4 | — | 10 | — | — |
| $C_{16}$—$C_{12}$ saturated fatty acid | — | 10 | — | — | 5 |
| Tallow sodium soap | — | — | 5 | — | — |
| Urea | 12 | — | — | — | 40 |
| Thiourea | — | — | — | 25 | — |
| Desoxy cholic acid | — | 50 | — | — | — |
| 4,4'-dinitrobiphenyl | — | — | 40 | — | 10 |

What is claimed is:

1. A particulate suds suppressing composition comprising a ternary mixture of:
   (a) a substantially water-insoluble hydrocarbon which is a member selected from the group consisting of aliphatic, alicyclic, aromatic and heterocyclic saturated or unsaturated hydrocarbons having from about 12 to about 40 carbon atoms and which is liquid at room temperature and atmospheric pressure;
   (b) a nonionic ethoxylate having an HLB in the range from 14 to 19; and
   (c) a compatibilizing agent which is a member selected from the group consisting of urea, thiourea, desoxycholic acid, the water-soluble salts of desoxycholic acid, α-cyclodextrin, β-cyclodextrin, 4,4'-dinitrobiphenyl and mixtures thereof;

the weight ratio of component (a) to component (b) being in the range from 5:1 to 1:4 and that of components (a)+(b) together to component (c) being in the range from 20:1 to 1:2.

2. The composition according to claim 1 wherein the liquid hydrocarbon has boiling point not less than 110° C.

3. The composition according to claim 1 wherein the nonionic ethoxylate is selected from condensation products of one mole of a $C_{12-20}$ monohydric alcohol with from 15 to 100 moles of ethylene oxide.

4. The composition according to claim 1 wherein the weight ratio of component (a) to component (b) is from 2:1 to 1:2 and that of components (a) and (b) together to component (c) is from 10:1 to 1:1.

5. The composition according to claim 1 which comprises (a) a suds suppressing system comprising (A) from 99.9 to 75% of a mixture of, by weight of the mixture (i) from 30 to 98% of said liquid hydrocarbon (ii) from 70% to 2% of an adjunct material selected from the group consisting of:

1. a substantially water-insoluble solid hydrocarbon having melting point in the range from 35° C. to 110° C.

2. a fatty ester of a mono- or polyhydric alcohol having from 1 to 40 carbon atoms in the hydrocarbon chain and mono- or polycarboxylic acids having from 1 to 40 carbon atoms in the hydrocarbon chain with the provisos that the total number of carbon atoms in the ester is equal to or greater than 16 and that at least one of the hydrocarbon radicals in the ester has 12 or more carbon atoms, and 3. mixtures thereof;

(B) from 0.1 to 25% of hydrophobic silica, (b) a nonionic ethoxylate having an HLB in the range from 14 to 19, and (c) a compatibilizing agent which is a member selected from the group consisting of urea, thiourea, desoxycholic acid, the water-soluble salts of desoxycholic acid, $\alpha$-cyclodextrin, $\beta$-cyclohextrin, 4,4'-dinitrobiphenyl and mixtures thereof;

the weight ratio of the suds suppressing system (a) to component (b) being in the range from 5:1 to 1:4 and that of components (a) and (b) together to component (c) being in the range from 20:1 to 1:2.

6. The composition according to claim 5 wherein the adjunct material consists of a mixture of paraffin wax and partial esters of glycerol with $C_1$ to $C_{20}$ fatty acids in ratio paraffin wax to glycerol esters in the range from 1:5 to 2:1.

7. A particulate suds suppressant product comprising about 2 parts of a suds suppressant composition according to claim 6 in admixture with from 5 to 12 parts of sodium tripolyphosphate.

8. A detergent composition comprising:

from 3-50% of an organic detergent surface active agent, from 3-50% of an inorganic or organic detergency builder, and an amount of suds suppressing composition according to claim 5 sufficient to provide from 0.01 to 5% by weight of the detergent composition of the suds suppressant system.

9. A detergent composition comprising:

from 3-20% of an anionic and/or nonionic detergent, from 3-50% of an inorganic or organic detergency builder and an amount of a suds suppressant product according to claim 7 sufficient to provide from 0.01 to 5% by weight of the detergent composition of the suds suppressant system.

* * * * *